Aug. 9, 1955

C. WOLSKI 2,714,953

SEED SIFTING APPARATUS

Filed Oct. 17, 1952

INVENTOR:
CASIMIR WOLSKI
BY
J Delattre Seguy
Attorney

Aug. 9, 1955   C. WOLSKI   2,714,953
SEED SIFTING APPARATUS
Filed Oct. 17, 1952   2 Sheets-Sheet 2

INVENTOR:
CASIMIR WOLSKI
BY
Attorney

United States Patent Office 2,714,953
Patented Aug. 9, 1955

2,714,953

SEED SIFTING APPARATUS

Casimir Wolski, Cromac, Haute-Vienne, France

Application October 17, 1952, Serial No. 315,344

Claims priority, application France October 23, 1951

2 Claims. (Cl. 209—12)

The present invention relates to an apparatus for sifting seeds and more particularly seeds of a substantially spherical shape such as purple clover seeds.

One object of this invention is to provide an apparatus of simple and comparatively inexpensive construction for separating efficiently the seeds of substantially spherical shape from their accompanying chaff and other impurities. Another object of the invention is to provide means incorporated in the said apparatus whereby substantially spherical seeds may be graded according to their size.

Further objects and advantages of the said invention will become apparent from the description now to follow of an embodiment thereof, given by way of example only and in which reference will be had to the accompanying drawing, in which.

Figure 1:
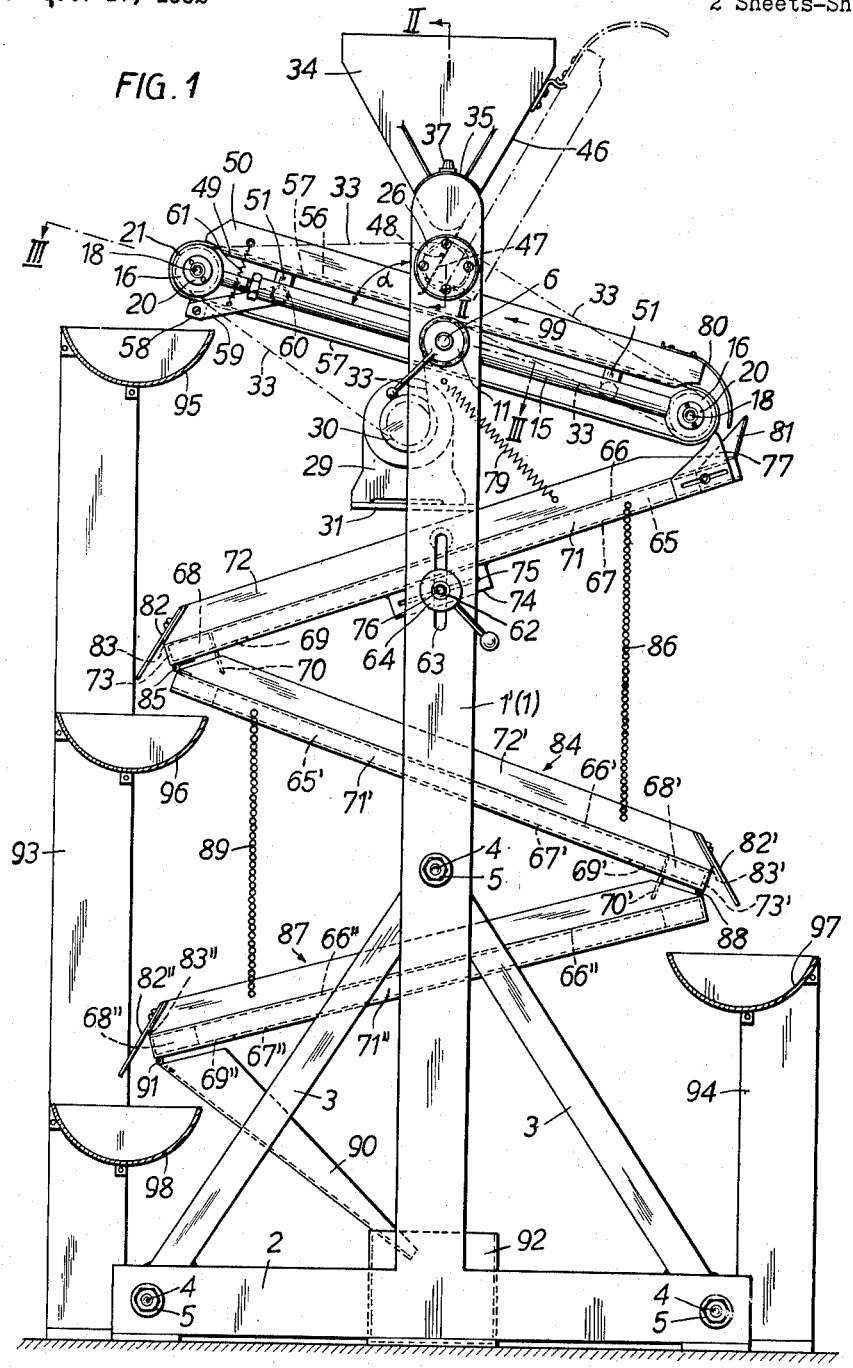
Fig. 1 is a lateral view of a clover seed sifting apparatus.

The apparatus comprises a frame constituted by two vertical columns 1 and 1' each consisting of a steel tube of rectangular cross-section and each integral with a horizontal foot 2 to which it is braced by two diagonal struts 3. The two columns 1, 1' and their feet 2 are maintained parallel and in spaced relation to each other by three bars 4 which have screw-threaded ends at which they are secured by nuts 5, one to the columns 1 and 1' and the two others to the ends of the feet 2.

Figure 3:
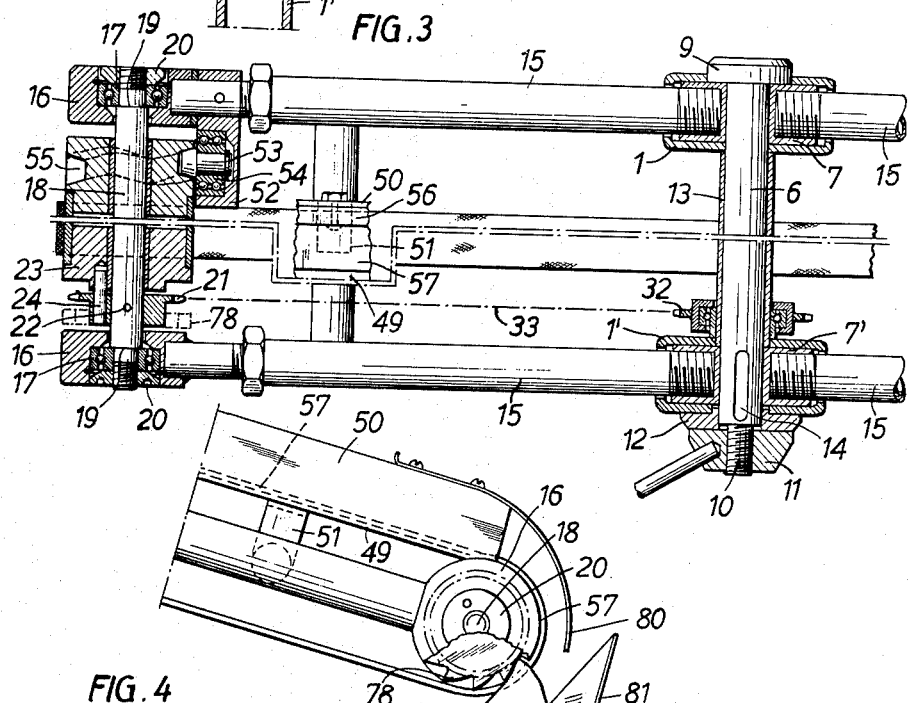
Fig. 3 is a partly sectional view taken on line III—III of Fig. 1 and showing the top sifting element of the apparatus.

At some distance from the top end of column 1, a hub piece 7 is lodged therein between its lateral walls, and a similar hub piece 7' is mounted at the same level within column 1' (Fig. 3). These hub pieces each have a central bore through which a bar 6 extends. Surrounding this bar 6 is a distance tube 13 which at one end abuts the inner lateral wall of column 1 and at its opposite end passes through an opening in the inner lateral wall of column 1' to abut the hub piece 7'. At this latter end, the bar 6 has a threaded extension 10 on which is screwed a nut 11; by tightening this nut an interposed centering washer 12, the outer lateral wall of column 1', and the hub piece 7' are pressed against each other and towards the end face of the distance tube 13, while at the opposite end of bar 6, its head 9 presses the hub piece 7 against the inner wall of column 1 and the latter against the other end face of the distance tube 13. A key 14 prevents rotation of the hub 7' and of the washer 12 on the bar 6 while the nut 11 is being tightened.

Each of the hubs 7, 7' carries two tubes 15 screwed into it at diametrally opposite points, in alignment with each other and parallel to the corresponding tubes 15 screwed into the opposite hub. The described mounting of the hubs permits adjustment of the angle α between the tubes 15 and the columns 1, 1'. At its remote end, each of the tubes 15 carries a bearing head 16 fitted with a ball bearing 17. In these bearings two shafts 18 are rotatably supported parallel to the aforementioned bar 6. The inner race of each bearing 17 is located on the corresponding shaft 18 by a shoulder 19 and by a nut 20 screwed onto the threaded end portion of the shaft. On each of the shafts 18, a sprocket 21 is fixed by a cross-pin 22. Besides this a cylindric roller 23 is mounted on each of the shafts 18 and angularly coupled to the sprocket 21 by a pin 24, while being axially displaceable on the said shaft. One of the two bearing heads 16 supporting each of the shafts 18 is provided with an arm 52 projecting towards the opposite bearing head. In this arm, a pin 53 is rotatably mounted in a ball bearing 54 and projects into a circumferential groove 55 in the end portion of the roller 23. Along the circumference of the latter, this groove undulates in axial direction so that on rotation of the shaft 18, the roller 23 is compelled by the pin 53 to move to and fro several times during each revolution.

On the tubes 15, a sheet-metal apron 49 which extends between the two rollers 23 and has upturned ledges 50 is mounted on suitable supports 51. These ledges are lined each with a wooden lath 56 of rectangular cross-section which does not extend quite down to the bottom of the apron, so that a guiding groove is provided between the said bottom and lath. An endless belt 57, preferably of fabric-reinforced rubber, runs over the rollers 23 and over the bottom of apron 49, with its margins in the said guiding grooves.

A wooden wiper 58, supported on swinging arms 59 articulated at 60 on the supports 51, resiliently engages the endless belt 57 over the full width thereof at the point where the latter leaves the underside of the left-hand or upper roller 23; springs 61 are provided to draw the arms 59 upwards for this purpose.

Figure 2:
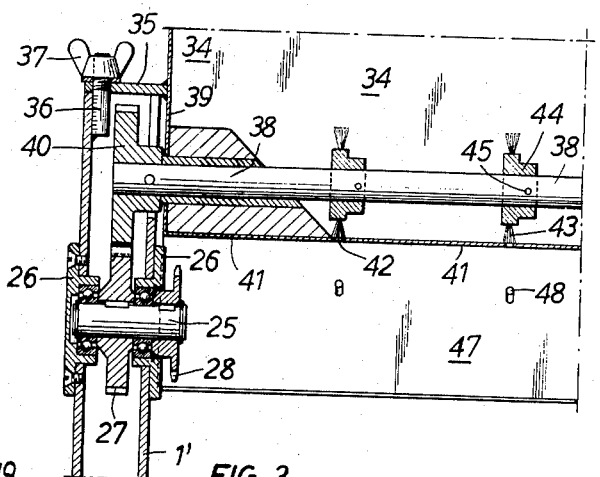
Fig. 2 is a vertical section through the top portion of the apparatus, taken on line II—II of Fig. 1.

At some distance above the hub 7', a pin 25 is rotatably supported in two bearing plates 26 mounted in the lateral faces of the column 1' (Fig. 2). Between these bearing plates 26 a gearwheel 27, and outside the column 1' a sprocket 28 are keyed to the pin 25. An electric motor 29 carrying a further sprocket 30 on its shaft is mounted on a console 31 fixed to the inner face of column 1'. Further, an idle sprocket 32 is rotatably supported on the distance tube 13 near the column 1'. All the said sprockets 21, 28, 30 and 32 are in alignment with each other and an endless chain 33 runs over all of them as indicated in dash-and-dot lines in Fig. 1.

On the top of columns 1, 1', a hopper 34 is mounted by means of a saddle-shaped flange 35 and retained by screws 36 with wing nuts 37. A shaft 38 is rotatably supported between the end or side walls 39 of the hopper 34 and outside the latter carries a gearwheel 40 which engages the gearwheel 27 on the pin 25. The bottom 41 of the hopper is curved to the shape of a cylinder segment the axis of which coincides with that of shaft 38 and at regular intervals has bottom holes 42. Over each of these holes, a rotary brush 43 is mounted on the shaft 38, its hub 44 being fixed on the said shaft by a cross-pin 45. To the back wall 46 of the hopper is welded an extension plate 47 which slopes downwardly at a steep angle towards the endless band 57 and under each hole 42 carries a pin 48.

Below the top sifting element mounted on the bar 6 and above described, the apparatus comprises a number of sieves for grading the sifted seeds. The first of these sieves is rockably mounted in a pair of bushings 62 which extend through slots 63 in the columns 1 and 1'. Each bushing has an integral collar (not shown) on the inner side of the column and on its outwardly threaded end a nut 64 is provided by which the bushing can be tightened on the column between its collar and nut, in any desired position in the slots 63.

Figure 4:
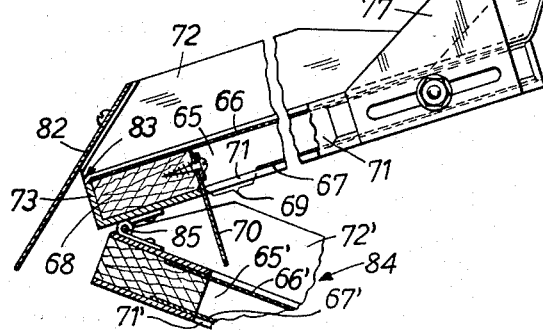
Fig. 4 is a partly sectional lateral view showing portions of the top sifting element and of two sieves, and their mutual connection.

The said first sieve comprises a rectangular wooden frame 65 over the top of which a wire screen 66 and over the bottom of which a metal sheet 67 are stretched. While the top wire screen 66 extends over the whole opening of the frame and its margins are nailed or otherwise fastened to the four sides of the frame, the bottom metal sheet ends short of the lower or left-hand traverse 68 of the frame so as to leave a gap 69 extending over the whole width of the frame, as shown in Fig. 4; only the remaining three sides of the metal sheet are fastened to the frame. A deflector plate 70 is screwed to the inner face of the said traverse 68 below the wire screen 66 and extends downwardly through the gap 69. The wooden frame 65 is supported in an outer sheet metal frame 71 the sides of which are of channel cross-section with upturned ledges 72. At the left-hand or bottom end, the sheet-metal frame is open at its top and only comprises a traverse 73 of L-shaped cross-section, while at its right-hand or top end, it is altogether open for insertion of the wooden frame 65. About halfway its length, each side of the frame 71 has a depending plate 74 provided with a longitudinal slot 75 (Fig. 1). This slot accommodates a screw-threaded, reduced-diameter extension (not shown) of a pin 76 by which the frame 71 is rockably supported in the aforementioned bushing 62. On this extension, a nut (not shown) is screwed by which the pin 76 can be secured in any desired position in the slot 75; accordingly, the position of the axis on which the frame 71 is rockable can be adjusted to some extent both in relation to the columns 1 and 1' and along the sides of the frame.

At its top or right-hand end, the sheet metal frame 71 further carries a triangular plate 77 adapted to engage a ratchet wheel 78 integral with the sprocket 21 (as shown in dash-and-dot lines in Fig. 3) on that shaft 18 which supports the endless band 57 at the lower or right-hand end of the top sifting device. A pair of springs 79 are provided to rock the frame 71 in counterclockwise direction as seen in Fig. 1 and thus to keep the plate 77 in engagement with the ratchet wheel 78.

Further, a curved deflecting plate 80 is mounted over the lower end of the top sifting device, and a cooperating deflecting plate 81 is mounted on the right-hand or upper end of the wooden frame 65, so that any material delivered at the said end of the top sifting device will be collected on the wire screen 66 of the said frame.

At their left or lower end, the lateral ledges 72 of the metal frame 71 support a further deflector plate 82 which extends downwardly over the edge of the wooden frame 65 at a short distance thereof, as shown in Fig. 4, so as to provide a gap 83 extending over the full width of the frame for delivery of the seeds which have not dropped through screen 66.

A further sieve 84 of similar construction as the first one, but not supported on the columns 1, 1' is hinged, at the left or upper end of the side of its metal frame 71', to the said left or lower end of frame 71, by means of hinges 85. At its right-hand lower end, the metal frame 71' of the sieve 84 is suspended on the corresponding upper end of frame 71 by means of a pair of chains 86. A delivery gap 83' similar to the gap 83 between the first sieve and its deflecting plate 82 is provided between the bottom traverse 73' of the metal frame 71' and its deflecting plate 82', and another delivery gap 69' is formed between the lower right-hand traverse 68' of the wooden frame 65' and the adjacent edge of the metal sheet 67' of the second sieve 84. A deflector 70' fixed to the said traverse 68' also extends downwards through the gap 69'. It will be noted that the parts of the sieve 84 which correspond to similar parts of the first sieve are indicated by the same reference numerals as these but provided with the index prime ('). The wire screen 66' of the second sieve has a somewhat narrower mesh than the corresponding screen 66 of the first sieve.

The frame 71'' of a third sieve 87 of exactly the same construction as the second sieve 84, but having a wire screen 66'' of still narrower mesh than the screen 66', is hinged at 88 to the right-hand lower end of the frame 71' of the second sieve. The left-hand lower end of the frame 71'' is suspended by a pair of chains 89 to the corresponding upper end of frame 71'. The parts of the sieve 87 are marked by the same numerals as the corresponding parts of the first and second sieves but affixed with the index second ('').

To the lower left-hand end of the metal frame 71'' of the third sieve, a chute 90 is hinged at 91. This chute is supported at its lower right hand end by the edge of an open-top recipient 92 lodged between the feet 2 of the frame. The chute 90 collects and directs into the recipient 92 whatever material drops out of the slot 69'' between the bottom metal sheet 67'' and the wooden frame traverse 68'' of the third sieve 87.

A series of collecting troughs is mounted on appropriate stands 93, 94 under the various discharge points or slots of the apparatus, namely: A collecting trough 95 under the left-hand upper end of the top sifting device, a similar trough 96 below the trough 95 under the discharge slot 83 of the first sieve, another trough 97 on the opposite side of the apparatus, under the discharge slot 83' of the second sieve 84, and finally, a fourth trough 98 below the trough 96 under the discharge slot 83'' of the third sieve 87.

In operation, when the electric motor 29 is running, it rotates the two cylindric rollers 23 by means of the chain 33, the sprockets 21 and the pins 24. The direction of rotation, for both rollers 23, is such that the top surface of the endless belt 57 moves upwards from right to left as seen in Fig. 1 and as indicated therein by the arrow 99. In their rotation, the rollers 23 are reciprocated axially by the cooperation of the pin 53 with the groove 55, so that the endless belt 57 in addition to its lengthwise movement over the said rollers 23 is reciprocated transversely at a rather high rate.

Simultaneously, due to the cooperation of the ratchet wheel 78 with the triangular plate 77 mounted on the frame 71, of the first sieve, the right-hand upper end of this sieve is alternately depressed by the teeth of the ratchet wheel 78 and sharply drawn upwards by the spring 79. The said first sieve therefore oscillates with its pins 76 in the bushings 62. As the right-hand end of this first sieve is depressed, its lower left-hand end rises. The left-hand end of the second sieve 84, which is hinged to that of the first sieve, and that of the third sieve which is suspended to the second sieve 84 by the chains 89 accordingly are raised as well, while the right-hand end of the second sieve 84, suspended by chains 86 to that of the first sieve, is dropped. The corresponding end of the third sieve, which is hinged on that of the second sieve, follows this downward movement. As the first sieve is rocked back by the springs 79, the various sieves return to their initial positions.

Simultaneously with the rollers 23, the motor 29 also rotates the shaft 38 in the top hopper 34, by means of the sprocket 28 also engaging the driving chain 33, the pin 25 and the gearwheels 27 and 40. Accordingly, the brushes 43 wipe over the respective bottom holes 42.

The hopper 34 being filled with only roughly winnowed clover seeds, the brushes 43 constantly wipe small quantities of this hopper contents through the holes 42 from which it drops onto the plate 47. In doing so, it hits the pins 48 which deflect the individual seeds and other particles and spread them evenly over the width of the plate 47. From the latter, the seeds and particles drop onto the inclined surface of the endless belt 57 which is moving upwards from right to left as seen in Fig. 1 while being transversely reciprocated for shaking the seeds to assist their motions. In this motion, the belt carries away the non-spherical particles by friction as they contact its surface and throws them over its top roller into the collecting trough 95, while the substantially spherical particles, which are able to roll on the belt surface and therefore are not frictionally engaged by it, travel down th inclined belt surface towards the right-hand end thereo. as seen in Fig. 1. In practice, these substantially spherical particles are the unbroken clover seeds, while the broken seeds and the chaff and refuse leaflets nearly without exception are of non-spherical shape and therefore are carried off into the trough 95. Thus, a very efficient sifting of the seeds is effected by the belt 57. Any such particles which happen to stick to the belt surface after it has turned over the roller 23 are wiped off by the wiper 58 and then also drop into the trough 95.

The spherical clover seeds which run down the belt surface drop over the right-hand end thereof and fall onto the screen 66 of the first sieve, which is inclined in a direction opposite to that of the top surface of the belt 57. The deflectors 80 and 81 cooperate in preventing such seeds from leaving the apparatus and becoming lost. The seeds then roll down the screen 66 which, it will be remembered, effects a rocking movement to assist the motion of the seeds, and the seeds which have a smaller diameter than the mesh of the wire screen 66 eventually pass through the latter. The taller seeds, which are seeds of the best quality, reach the discharge gap 83 without having dropped through the screen and are collected in the trough 96. On the other hand, the seeds which have passed through the screen 66 fall onto the sheet metal bottom 67 and are discharged onto the screen 66' of the second sieve 84. In the same way as with the first sieve, seeds which have a smaller diameter than the mesh of screen 66' drop through the latter onto the bottom sheet 67' and are delivered through the gap 69' at the bottom end of the latter, while the taller seeds, which are of smaller diameter than the mesh of screen 66 but of larger diameter than that of screen 66', roll down the latter and pass through the gap 83' into the trough 97 where they are collected as second quality seeds.

Finally, the seeds delivered through the gap 69', i. e. those of smaller diameter than the mesh of screen 66', drop onto the screen 66'' of the third sieve, and those which still have a larger diameter than the mesh of that screen 66'' roll down over the latter, through the gap 83'' at the bottom end thereof, and are collected as third quality seeds in the trough 98. Those seeds which are small enough to pass through the screen 66'' cannot be considered as usable. They roll down the metal sheet bottom 67'' of this third sieve and are discharged through the gap 69'' at its bottom end, whence the chute directs them into the recipient 92 where they are collected as refuse.

When the motor 29 is cut out, the endless belt 57 is arrested and the various sieves obviously cease to move. Simultaneously, the shaft 38 in the hopper 34 is stopped as well; it will be noted that as this occurs, each of the brushes 43 obturates the corresponding bottom hole 42 against further delivery of seeds from the hopper. Therefore, it is not necessary to provide and actuate a separate hopper closing valve to prevent loss of seeds, and operation of the apparatus can be resumed at once by merely starting motor 29 again.

For efficient operation of the apparatus with certain kinds of seeds, or at high speeds, the angle of inclination of the surface of the endless belt 57 may be somewhat critical as the tendency of the substantially spherical seeds to roll down the belt might be impaired by imperfection of their shape or roughness of their surface, while on the other hand certain refuse particles may have such shape or smoothness that they are but lightly engaged by friction on the belt. The inclination of the belt surface must therefore be selected in accordance with the material to be sifted. This is easily achieved by loosening the nut 10, rocking the whole top sifting device about the axis of the bar 6 until the belt surface has the desired inclination, and tightening the nut 10 again. Of course, the position of the bushings 62 in the slots 63 of the columns 1, 1' and that of the pins 76 in the slots 75 on frame 71 of the first sieve may have to be adjusted accordingly thereafter to ensure correct cooperation of the right-hand ends of the top sifting device and the said sieve.

What I claim is:

1. In a seed sifting apparatus, an endless conveyer belt, at least two rotatably supported and axially shiftable rollers supporting said conveyer belt with a portion thereof in an inclined plane, each of the said rollers having an axially undulating circumferential groove, fixed abutment members each engaging the said groove of one of the said rollers, a hopper mounted above the said inclined portion of the said belt and having a cylinder segment shaped bottom provided with spaced perforations, substantially cylindric brush means rotatably supported in said hopper in contact with said bottom at least in the region of each of the said perforations, means for rotating said rollers so as to advance said conveyer belt lengthwise of itself with its said portion moving upwardly in a laterally undulating path and for simultaneously rotating said brush means for wiping seed material from the interior of said hopper through said perforations onto said portion of the conveyer belt to enable rollably shaped seeds in said material to roll down said portion of the conveyer belt whereas the remaining components of said material are carried upwardly by said portion of the belt, a series of alternately inclined sifting assemblies suspended to each other, the uppermost of said sifting assemblies being rockably supported with its higher end portion below the lower end of said portion of the conveyer belt, each of said sifting assemblies comprising a sifting screen and a collecting apron mounted below said sifting screen and leaving a delivery gap at its lower end, the higher end portion of each subsequent sifting assembly being arranged below said delivery gap of the upwardly adjacent sifting assembly, and means adjacent the lower end of each of the said sifting assemblies for separately collecting such material as drops over the lower end of the said sifting screen of each of the said sifting assemblies.

2. In a seed sifting apparatus as claimed in claim 1, a cam wheel angularly coupled to one of the said rollers, a projection on said uppermost sifting assembly, and spring means biassing said uppermost sifting assembly to apply its said projection against said cam wheel.

References Cited in the file of this patent

UNITED STATES PATENTS

| 163,213 | Kurth | May 11, 1875 |
| 261,193 | Winchester | July 18, 1882 |
| 359,044 | Welker | Mar. 8, 1887 |
| 488,443 | Miller | Dec. 20, 1892 |
| 891,424 | Jessup | June 23, 1908 |
| 907,555 | Arneson | Dec. 22, 1908 |
| 909,076 | Fowles | Jan. 5, 1909 |
| 930,853 | Franks | Aug. 10, 1909 |
| 1,945,242 | Walker | Jan. 30, 1934 |